(12) United States Patent
Kuroda et al.

(10) Patent No.: US 10,237,785 B2
(45) Date of Patent: Mar. 19, 2019

(54) FREQUENCY CHANNEL SETTING METHOD AND BASE STATION APPARATUS

(71) Applicant: Murata Manufacturing Co., Ltd., Kyoto (JP)

(72) Inventors: Katsuhito Kuroda, Kyoto (JP); Kengo Onaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 28 days.

(21) Appl. No.: 15/665,854

(22) Filed: Aug. 1, 2017

(65) Prior Publication Data
US 2017/0332280 A1 Nov. 16, 2017

Related U.S. Application Data

(63) Continuation of application No. PCT/JP2016/052073, filed on Jan. 26, 2016.

(30) Foreign Application Priority Data

Feb. 3, 2015 (JP) .................................. 2015-018969

(51) Int. Cl.
*H04W 28/16* (2009.01)
*H04W 16/10* (2009.01)
(Continued)

(52) U.S. Cl.
CPC ............ *H04W 28/16* (2013.01); *H04B 1/525* (2013.01); *H04L 5/0098* (2013.01); *H04W 16/10* (2013.01);
(Continued)

(58) Field of Classification Search
CPC ... H04W 28/16; H04W 16/10; H04W 72/042; H04W 72/0453; H04L 5/0098; H04B 1/525
See application file for complete search history.

(56) References Cited

U.S. PATENT DOCUMENTS 8,526,388 B1 * 9/2013 Kaukovuori ........ H04W 72/082
370/329
9,184,960 B1 * 11/2015 Harel ................ H04L 25/03006
(Continued)

FOREIGN PATENT DOCUMENTS

CN         103002450 A    3/2013
JP         2014-526847 A  10/2014

OTHER PUBLICATIONS

International Search Report issued in Application No. PCT/JP2016/052073 dated Apr. 19, 2016.
(Continued)

*Primary Examiner* — Ivan O Latorre
(74) *Attorney, Agent, or Firm* — Pearne & Gordon LLP (57) ABSTRACT

Provided is a method for setting a communication channel for a base station employing carrier aggregation, which enables simultaneous use of radio waves at a plurality of frequency bands of different frequencies or a base station apparatus for setting a communication channel in accordance with carrier aggregation, which enables simultaneous transmission and reception at a plurality of frequency bands of different frequencies. At least one of a downlink frequency channel in a first frequency band and a downlink frequency channel in a second frequency band is set such that a frequency range of harmonics of an uplink frequency range in the first frequency band does not overlap a downlink frequency range in the second frequency band, the first frequency band and the second frequency band being included in the plurality of frequency bands for use in carrier aggregation.

2 Claims, 6 Drawing Sheets

(51) Int. Cl.
    *H04B 1/525*   (2015.01)
    *H04L 5/00*    (2006.01)
    *H04W 72/04*   (2009.01)
(52) U.S. Cl.
    CPC ...... *H04W 72/042* (2013.01); *H04W 72/0453* (2013.01)

(56) References Cited

U.S. PATENT DOCUMENTS

| | | | | |
|---|---|---|---|---|
| 2011/0237188 A1* | 9/2011 | Sen | ............ | H04B 15/00 455/41.2 |
| 2012/0207040 A1* | 8/2012 | Comsa | ............ | H04W 72/1215 370/252 |
| 2013/0044621 A1* | 2/2013 | Jung | ............ | H04W 72/082 370/252 |
| 2013/0230013 A1* | 9/2013 | Seo | ............ | H04L 27/2602 370/329 |
| 2013/0242939 A1* | 9/2013 | Wagner | ............ | H04L 1/0003 370/331 |
| 2013/0250819 A1* | 9/2013 | Khlat | ............ | H04B 1/10 370/278 |
| 2014/0003300 A1* | 1/2014 | Weissman | ............ | H04B 7/0404 370/273 |
| 2014/0092825 A1* | 4/2014 | Bostrom | ............ | H04W 72/048 370/329 |
| 2014/0153433 A1* | 6/2014 | Zhou | ............ | H04W 72/1231 370/252 |
| 2014/0329475 A1 | 11/2014 | Ella | | |
| 2015/0030098 A1* | 1/2015 | Ljung | ............ | H04L 25/03006 375/285 |
| 2017/0294941 A1* | 10/2017 | Long | ............ | H02J 50/10 |

OTHER PUBLICATIONS

Written Opinion issued in Application No. PCT/JP2016/052073 dated Apr. 19, 2016.

Telecom Italia, Vodafone, Orange, Telefonica, Deutsche Telekom, "On the support of multiple LTE carrier aggregation combinations" 3GPP TSG-RAN WG4 Meeting #64bis, R4-125692, Santa Rosa, CA, US, Oct. 8-12, 2012.

Chinese Office Action for Patent Application No. 201680008379.8 dated Dec. 28, 2018.

* cited by examiner

| | Lower 700MHz | | | | | | | | Upper 700MHz | | | | | | | |
|---|---|---|---|---|---|---|---|---|---|---|---|---|---|---|---|---|
| Block | A UL | B UL | C UL | D U/D | E U/D | A DL | B DL | C DL | C DL | A D DL | Public Safety | C UL | A D UL | Public Safety | | | |

698 704 710 716 722 728 734 740 746 752 758 764 770 776 782 788 794 800 806

| Band | | 12 UP | | | | 12 DOWN | | | 13 DOWN | 14 DOWN | | 13 UP | 14 UP | | |
|---|---|---|---|---|---|---|---|---|---|---|---|---|---|---|---|

698 704 710 716 722 728 734 740 746 752 758 764 770 776 782 788 794 800 806

| Channel | 52 | 53 | 54 | 55 | 56 | 57 | 58 | 59 | 60 | 61 | 62 | 63 | 64 | 65 | 66 | 67 | 68 | 69 |

FREQUENCY CHANNEL SETTING METHOD AND BASE STATION APPARATUS

This application is a continuation of International Application No. PCT/JP2016/052073 filed on Jan. 26, 2016 which claims priority from Japanese Patent Application No. 2015-018969 filed on Feb. 3, 2015. The contents of these applications are incorporated herein by reference in their entireties.

BACKGROUND

Technical Field

The present disclosure relates to a method for setting a communication channel for a base station and to a base station apparatus, the method and device employing carrier aggregation, which enables combined use of radio waves at a plurality of frequency bands of different frequencies.

Carrier aggregation, which enables simultaneous use of radio waves at a plurality of frequency bands of different frequencies, is implemented in wireless communication between a mobile station, such as a cellular phone, and a base station. An example of a disclosure relating to a front-end circuit for carrier aggregation is illustrated in Patent Document 1.

The carrier aggregation technology can provide communications simultaneously using a plurality of channels by utilizing a frequency range (channel) of different frequencies, such as a 10 MHz-wide or 20 MHz-wide range, as a base unit. This enables substantial wide-band communications, and produces benefits, such as "enhancement of the speed and stability of communications," "frequency diversity advantage," and "statistical multiplexing advantage."

Patent Document 1: Japanese Unexamined Patent Application Publication (Translation of PCT Application) No. 2014-526847

BRIEF SUMMARY

When carrier aggregation is implemented at a plurality of frequency bands including a first frequency band and a second frequency band, a frequency range of n times an uplink frequency range in the first frequency band may overlap a downlink frequency range in the second frequency band.

Figure 8:
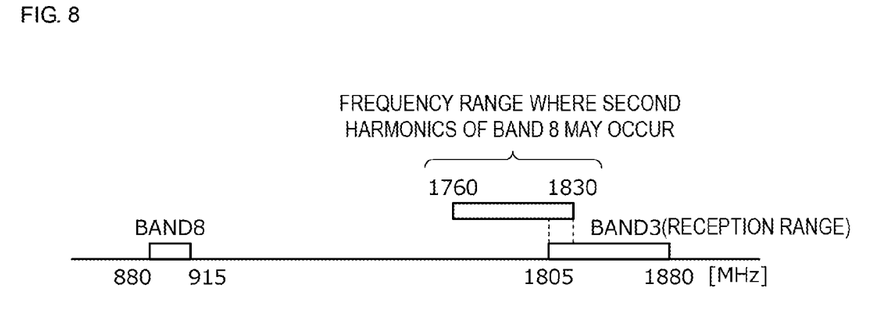
FIG. 8 illustrates frequency ranges of signals in an example in which the frequency of a harmonic (second harmonic) of a transmission signal overlaps the frequency of a reception signal in a communication terminal.

For example, in carrier aggregation with a combined use of Band 3 and Band 8 in long term evolution (LTE), there is an overlap between a frequency range (1760 MHz-1830 MHz) of twice the transmission range in Band 8 and the reception range (1805 MHz-1880 MHz) in Band 3 in a communication terminal. If a harmonic of a transmission signal occurs, this harmonic (second harmonic) overlaps the frequency of a reception signal. FIG. 8 illustrates frequency ranges of signals in this example.

As described above, when a frequency range of n times an uplink frequency range in the first frequency band overlaps a downlink frequency range in the second frequency band, the first frequency band and the second frequency band being included in a plurality of frequency bands for use in carrier aggregation, a harmonic of a transmission signal in the first frequency band is superimposed on a reception signal in the second frequency band on a communication terminal side, and the reception sensitivity significantly degrades. A harmonic occurring in a transmission circuit can be suppressed by a low pass filter or the like arranged in a transmission path. A harmonic occurring in the vicinity of an antenna, for example, in an antenna tuner is superimposed on a reception signal, and it cannot be suppressed by a filter and reaches a reception circuit. This results in the significant degradation in reception sensitivity, as described above.

The present disclosure provides a frequency range setting method and a base station apparatus in carrier aggregation capable of avoiding degradation in reception sensitivity in a communication terminal caused by superimposition of a harmonic of a transmission signal in a first frequency band on a reception signal in a second frequency band, the first frequency band and the second frequency band being included in a plurality of frequency bands for use in carrier aggregation.

(1) A method for setting a communication channel according to the present disclosure is a method for setting a communication channel for a base station in accordance with carrier aggregation, which enables simultaneous transmission and reception at a plurality of frequency bands of different frequencies. The method includes setting at least one of a downlink frequency channel in a first frequency band and a downlink frequency channel in a second frequency band such that a frequency range of harmonics of an uplink frequency range in the first frequency band does not overlap a downlink frequency range in the second frequency band, the first frequency band and the second frequency band being included in the plurality of frequency bands for use in carrier aggregation, the second frequency band having frequencies higher than frequencies of the first frequency band.

(2) A method for setting a communication channel according to the present disclosure is a method for setting a communication channel for a base station that employs carrier aggregation, which enables simultaneous use of radio waves at a plurality of frequency bands of different frequencies. The method includes a channel setting step of setting uplink and downlink frequency channels in a first frequency band and uplink and downlink frequency channels in a second frequency band, the first frequency band and the second frequency band being included in the plurality of frequency bands for use in carrier aggregation, the second frequency band having frequencies higher than frequencies of the first frequency band, a determining step of determining whether a frequency range of harmonics of an uplink frequency range in the first frequency band overlaps a downlink frequency range in the second frequency band, an available channel searching step of searching for an available channel in at least one of the downlink frequency channel in the first frequency band and the downlink frequency channel in the second frequency band when the frequency range of harmonics of the uplink frequency range in the first frequency band overlaps the downlink frequency range in the second frequency band, and a channel resetting step of resetting at least one of the downlink frequency channel in the first frequency band and the downlink frequency channel in the second frequency band by using the available channel such that the frequency range of harmonics of the uplink frequency range in the first frequency band does not overlap the downlink frequency range in the second frequency band, when the available channel is found.

(3) A base station apparatus according to the present disclosure is a base station apparatus for setting a communication channel in accordance with carrier aggregation, which enables simultaneous transmission and reception at a plurality of frequency bands of different frequencies. The base station apparatus includes a unit configured to set at least one of a downlink frequency channel in a first frequency band and a downlink frequency channel in a second frequency band such that a frequency range of harmonics of an uplink frequency range in the first frequency band does not overlap a downlink frequency range in the second frequency band, the first frequency band and the second frequency band being included in the plurality of frequency bands for use in carrier aggregation, the second frequency band having frequencies higher than frequencies of the first frequency band.

(4) A base station apparatus according to the present disclosure is a base station apparatus for setting a communication channel in accordance with carrier aggregation, which enables simultaneous transmission and reception at a plurality of frequency bands of different frequencies. The base station apparatus includes a channel setting unit configured to set uplink and downlink frequency channels in a first frequency band and uplink and downlink frequency channels in a second frequency band, the first frequency band and the second frequency band being included in the plurality of frequency bands for use in carrier aggregation, the second frequency band having frequencies higher than frequencies of the first frequency band, a determining unit configured to determine whether a frequency range of harmonics of an uplink frequency range in the first frequency band overlaps a downlink frequency range in the second frequency band, an available channel searching unit configured to search for an available channel in at least one of the downlink frequency channel in the first frequency band and the downlink frequency channel in the second frequency band when the frequency range of harmonics of the uplink frequency range in the first frequency band overlaps the downlink frequency range in the second frequency band, and a channel resetting unit configured to reset at least one of the downlink frequency channel in the first frequency band and the downlink frequency channel in the second frequency band by using the available channel such that the frequency range of harmonics of the uplink frequency range in the first frequency band does not overlap the downlink frequency range in the second frequency band, when the available channel is found.

According to the present disclosure, a first frequency band and a second frequency band, a harmonic of a transmission signal in a first frequency band is not superimposed on a reception signal in a second frequency band, the first frequency band and the second frequency band being included in a plurality of frequency bands for use in carrier aggregation, degradation in reception sensitivity in a communication terminal can be prevented.

DETAILED DESCRIPTION

Figure 1:
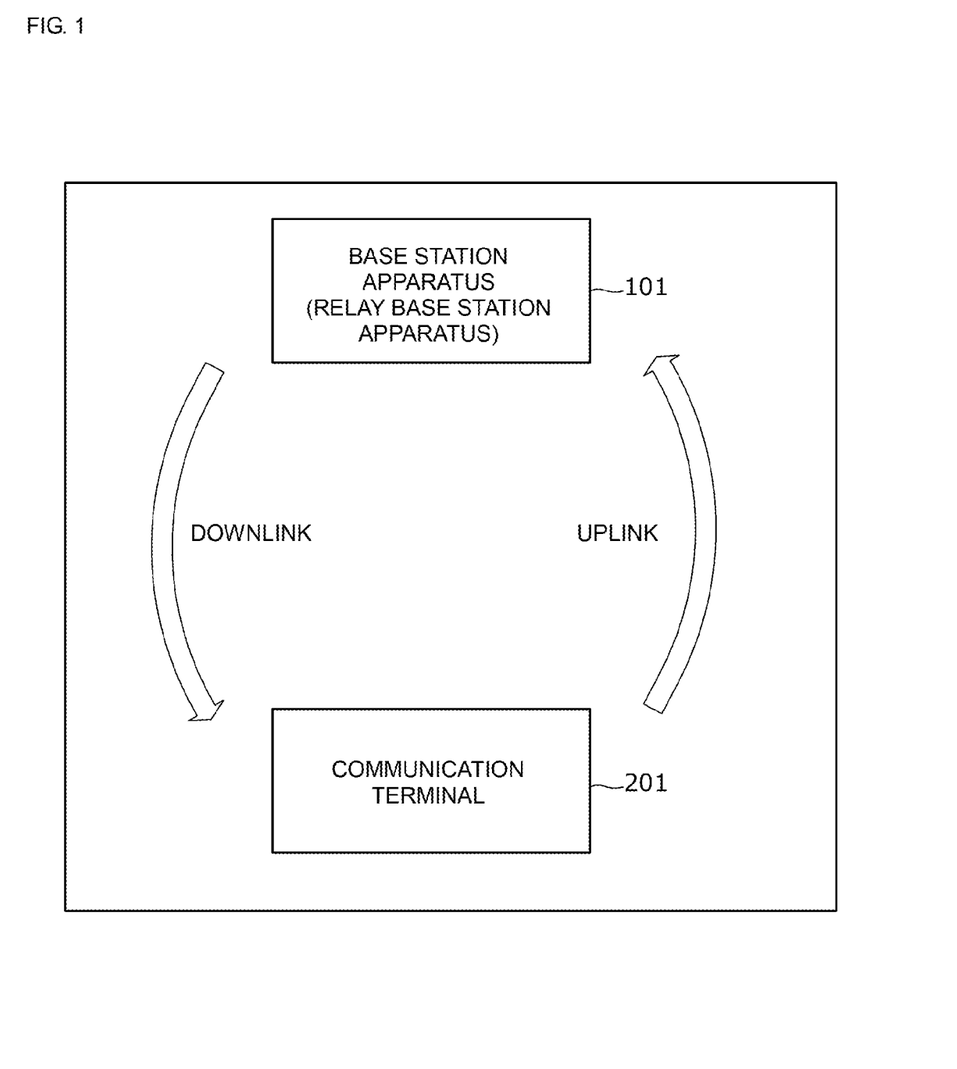
FIG. 1 illustrates a communication system including a base station apparatus and a communication terminal.

FIG. 1 illustrates a communication system, such as a cellular phone system, that includes a base station apparatus and a communication terminal.

A base station apparatus 101 transmits a downlink signal to a communication terminal 201, and the communication terminal 201 receives it. The communication terminal 201 transmits an uplink signal to the base station apparatus 101, and the base station apparatus 101 receives it.

The present disclosure is also applicable to a communication system including a relay base station apparatus and a communication terminal. In that case, the base station apparatus 101 illustrated in FIG. 1 is the relay base station apparatus.

Figure 2:
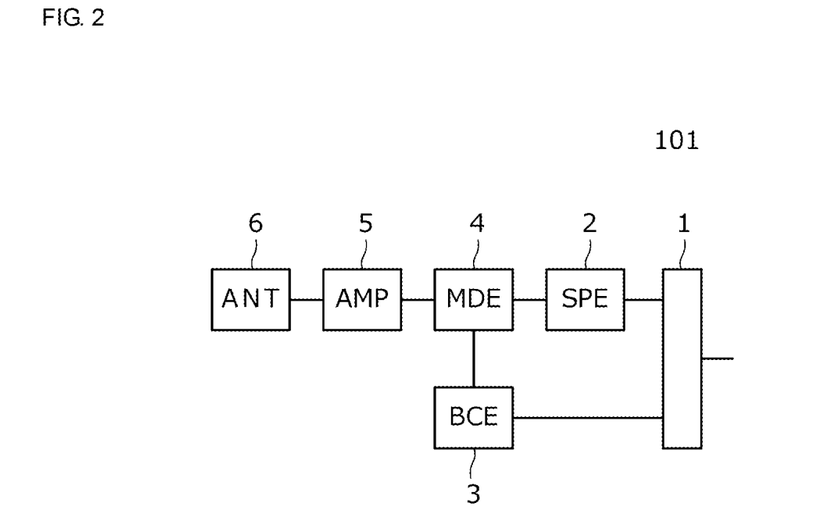
FIG. 2 is a block diagram that illustrates a basic configuration of a base station apparatus 101 used in a mobile communication system.

FIG. 2 is a block diagram that illustrates a basic configuration of the base station apparatus 101 used in the mobile communication system. The base station apparatus 101 includes a digital mobile subscriber switch 1, a speech processing device 2, a base station control device 3, a base station modulation/demodulation device 4, a base station amplifier device 5, and a base station antenna 6.

The digital mobile subscriber switch 1 switches a digital mobile subscriber line. The speech processing device 2 performs speech data processing. The base station modulation/demodulation device 4 modulates transmission data into a high-frequency transmission signal and demodulates a high-frequency reception signal into a reception signal. The base station amplifier device 5 amplifies a high-frequency transmission signal and amplifies a high-frequency reception signal. The base station antenna 6 includes an antenna, a duplexer, and a reception signal amplifier.

In the base station apparatus 101, the base station control device 3 sets downlink frequency ranges (transmission channels) and uplink frequency ranges (reception channels) in a plurality of frequency bands for use in carrier aggregation on the basis of the LTE-Advanced (standardized by the International Telecommunication Union Radiocommunication Sector (ITU-R)).

Figure 3:
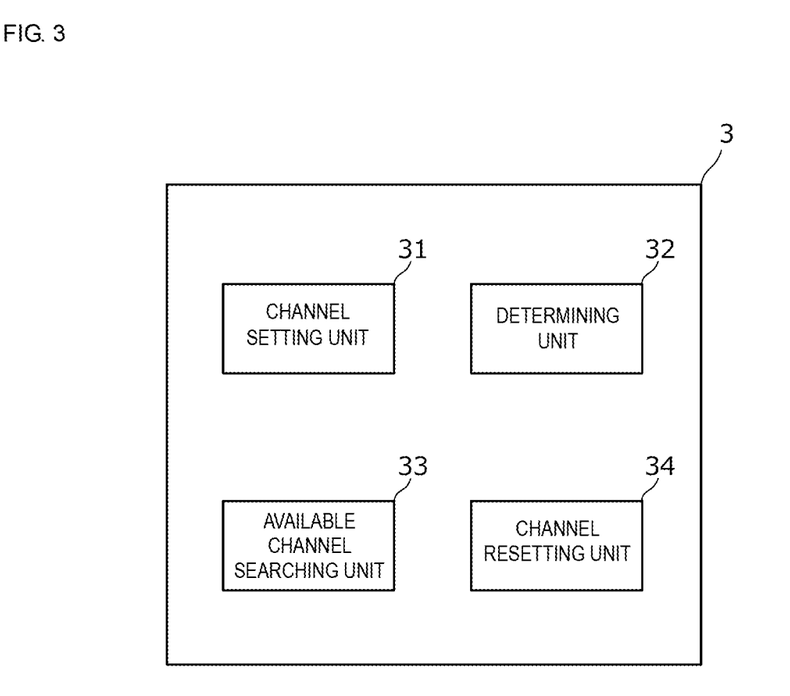
FIG. 3 illustrates a configuration of a controller relating to channel setting in a base station control device 3.

FIG. 3 illustrates a configuration of a controller relating to channel setting in the above-described base station control device 3. The base station control device 3 includes a channel setting unit 31, a determining unit 32, an available channel searching unit 33, and a channel resetting unit 34. The details of controlling by the units are described below.

[Channel Setting Unit]

The channel setting unit sets uplink and downlink frequency channels in a first frequency band and uplink and downlink frequency channels in a second frequency band whose frequencies are higher than the frequencies of the first frequency band, the first frequency band and the second frequency band being included in a plurality of frequency bands for use in carrier aggregation.

[Determining Unit]

The determining unit determines whether a frequency range of harmonics of an uplink frequency range in the first frequency band overlaps a downlink frequency range in the second frequency band.

[Available Channel Searching Unit]

The available channel searching unit searches for an available channel in at least one of the downlink frequency channel in the first frequency band and the downlink frequency channel in the second frequency band when the frequency range of harmonics of the uplink frequency range in the first frequency band overlaps the downlink frequency range in the second frequency band.

[Channel Resetting Unit]

The channel resetting unit resets at least one of the downlink frequency channel in the first frequency band and the downlink frequency channel in the second frequency band by using the available channel such that the frequency range of harmonics of the uplink frequency range in the first frequency band does not overlap the downlink frequency range in the second frequency band, when an available channel is found.

Figure 4:
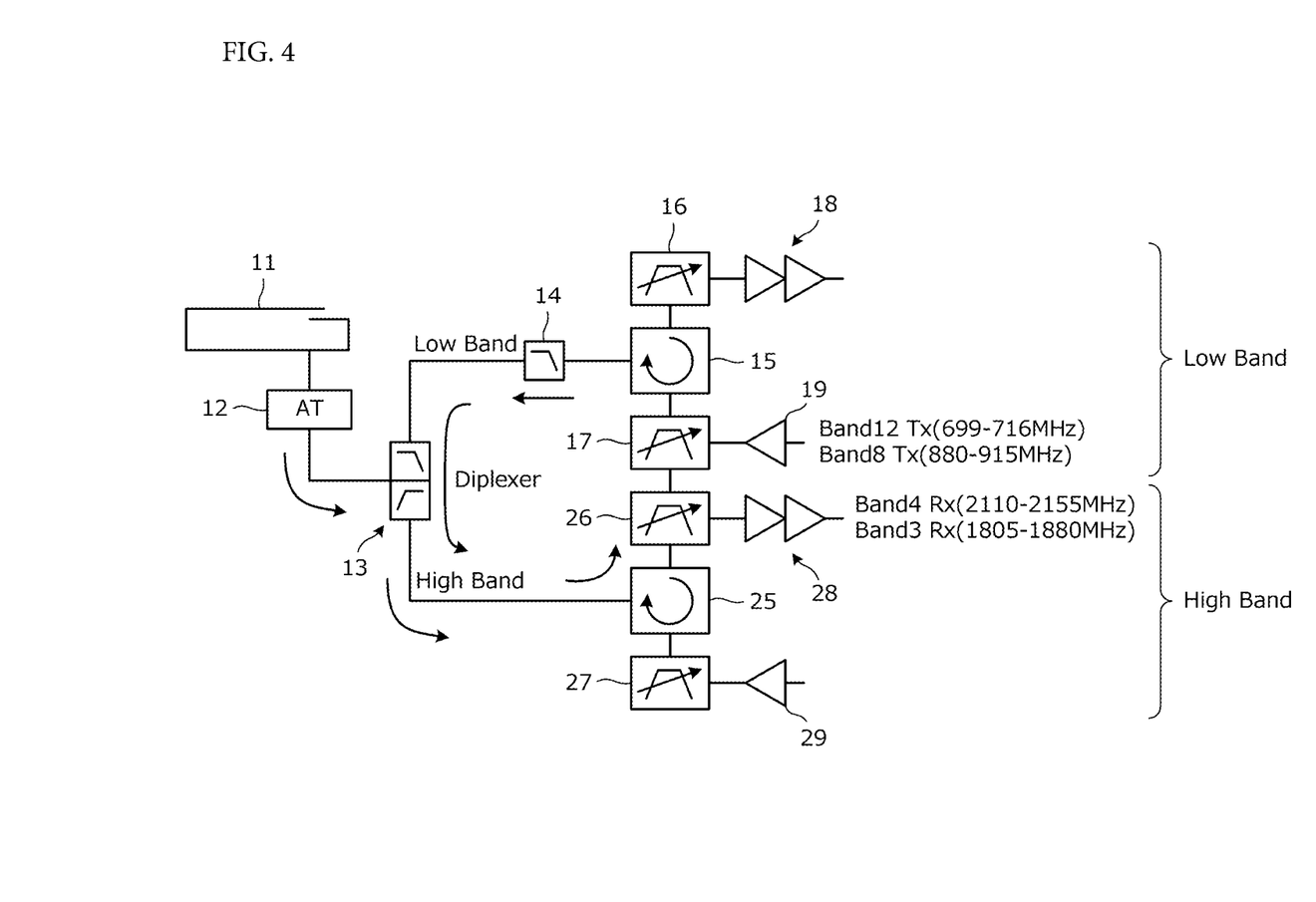
FIG. 4 is a block diagram that illustrates a configuration of a high-frequency circuit portion in the communication terminal.

FIG. 4 is a block diagram that illustrates a configuration of a high-frequency circuit portion in the communication terminal. The high-frequency circuit portion includes an antenna 11, an antenna tuner 12, a diplexer 13, a low pass filter 14, circulators 15 and 25, band pass filters 16, 17, 26, and 27, reception signal amplifier circuits 18 and 28, and transmission signal amplifier circuits 19 and 29.

The antenna 11 is a one-feed antenna that supports dual frequency bands. The antenna tuner 12 is an impedance matching circuit for the antenna 11 and a feeder circuit to the antenna 11. The diplexer 13 separates high-band signals and low-band signals. The low pass filter 14 interrupts a high-band component leaking from a low-band port of the diplexer 13.

The circulator 15 transfers a low-band transmission signal from the band pass filter 17 toward the low pass filter 14 and transfers a low-band reception signal from the low pass filter 14 to the band pass filter 16. The reception signal amplifier circuit 18 amplifies a low-band reception signal and outputs it to a low-band reception circuit. The transmission signal amplifier circuit 19 amplifies a low-band transmission signal and outputs it to the band pass filter 17.

The circulator 25 transfers a high-band transmission signal from the band pass filter 27 to the diplexer 13 and transfers a high-band reception signal from the diplexer 13 to the band pass filter 26. The reception signal amplifier circuit 28 amplifies a high-band reception signal and outputs it to a high-band reception circuit. The transmission signal amplifier circuit 29 amplifies a high-band transmission signal and outputs it to the band pass filter 27.

Examples of the above-described low and high bands are listed below. The low band is a frequency band having a frequency range at or below 1 GHz, and the high band corresponds to a frequency band at or above 1 GHz.

[Low Band]

| | |
|---|---|
| Band 12 Uplink (Transmission) | 699 MHz-716 MHz |
| Band 8 Uplink (Transmission) | 880 MHz-915 MHz |

[High Band]

| | |
|---|---|
| Band 4 Downlink (Reception) | 2110 MHz-2155 MHz |
| Band 3 Downlink (Reception) | 1805 MHz-1880 MHz |

In one example, when carrier aggregation is employed at two frequency bands of Band 8 and Band 3, the transmission signal amplifier circuit 19 for low bands outputs transmission signals in a frequency channel within a range of 880 MHz to 915 MHz, and harmonic components within a range of 880 MHz to 915 MHz occur in the transmission signal amplifier circuit 19, circulator 15, and antenna tuner 12. The harmonic components occurring in the transmission signal amplifier circuit 19 and circulator 15 are suppressed by the low pass filter 14 and diplexer 13. However, a reflected signal in the harmonic component occurring in the antenna tuner 12 passes through a high-pass filter portion in the diplexer 13 and enters the high-band reception circuit through the circulator 25 and band pass filter 26.

In particular, because a frequency range of second-order harmonics (second harmonics) of uplink (transmission) signals in Band 8 is 1760 MHz to 1830 MHz, it overlaps in part a frequency range of 1805 MHz to 1880 MHz of downlink (reception) signals in Band 3, and the reception sensitivity in communication using Band 3 degrades.

In another example, when carrier aggregation is employed at two frequency bands of Band 12 and Band 4, the transmission signal amplifier circuit 19 for low bands outputs transmission signals in a frequency channel within a range of 699 MHz to 716 MHz, and harmonic components within a range of 699 MHz to 716 MHz occur in the transmission signal amplifier circuit 19, circulator 15, and antenna tuner 12. The harmonic components occurring in the transmission signal amplifier circuit 19 and circulator 15 are suppressed by the low pass filter 14 and diplexer 13. However, a reflected signal in the harmonic component occurring in the antenna tuner 12 passes through the high-pass filter portion in the diplexer 13 and enters the high-band reception circuit through the circulator 25 and band pass filter 26.

In particular, because a frequency range of third-order harmonics (third harmonics) of uplink (transmission) signals in Band 12 is 2097 MHz to 2148 MHz, it overlaps in part a frequency range of 2110 MHz to 2155 MHz of downlink (reception) signals in Band 4, and the reception sensitivity in communication using Band 4 degrades.

The base station control device 3 illustrated in FIG. 3 sets the downlink frequency channel in the second frequency band such that a harmonic frequency range of two or three times the uplink frequency range in the first frequency band does not overlap the downlink frequency range in the second frequency band, the first frequency band and the second frequency band being included in the plurality of frequency bands for use in carrier aggregation. Alternatively, the base station control device 3 sets the uplink frequency channel in the first frequency band such that the frequency range of two or three times the uplink frequency range in the first frequency band does not overlap the downlink frequency range in the second frequency band, the first frequency band and the second frequency band being included in the plurality of frequency bands for use in carrier aggregation.

Figure 5:
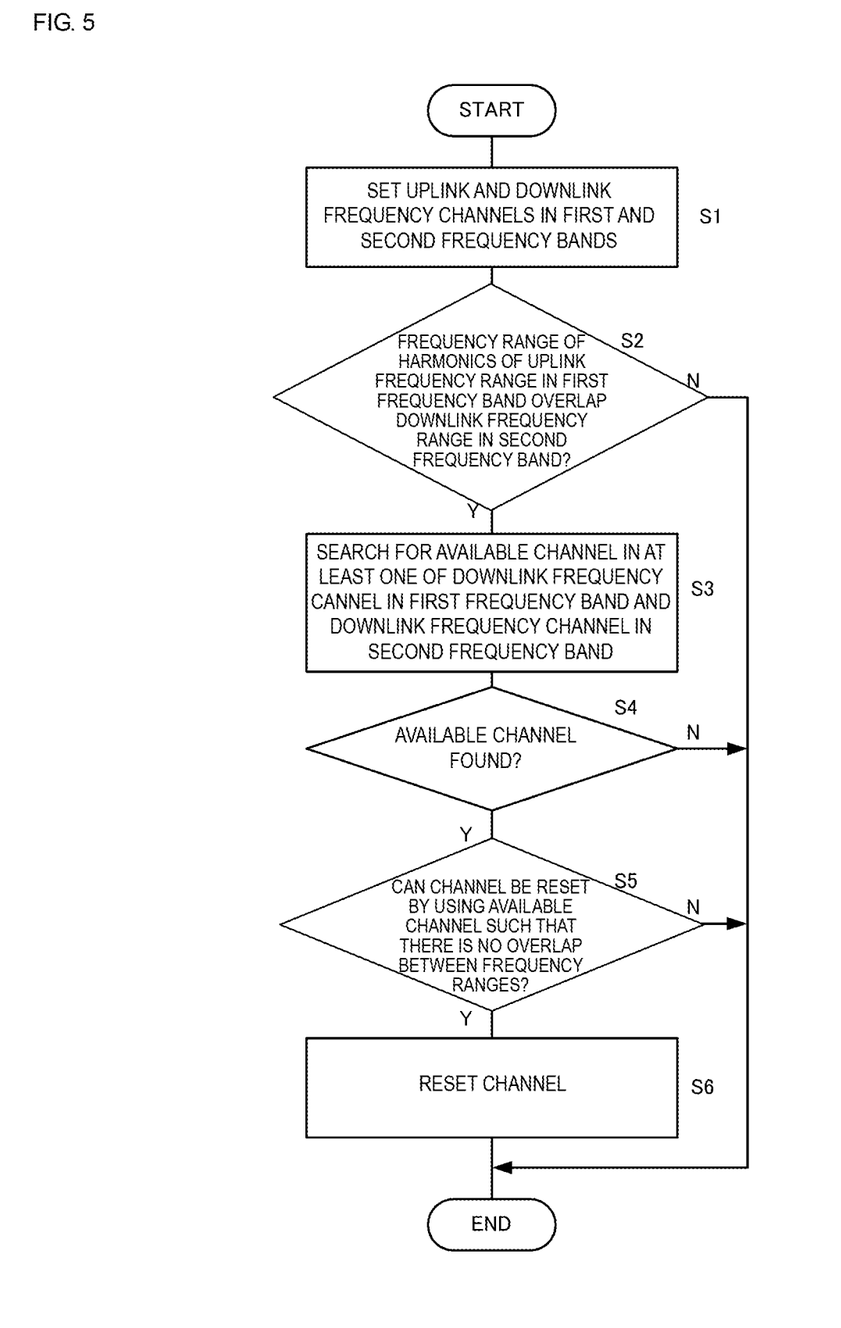
FIG. 5 is a flow chart that illustrates a control procedure relating to channel setting in the base station control device 3.

FIG. 5 is a flow chart that illustrates a control procedure relating to channel setting in the above-described base station control device 3.

First, the base station control device 3 sets the uplink and downlink frequency channels in the first frequency band and the uplink and downlink frequency channels in the second frequency band, the first and second frequency bands being used in carrier aggregation (S1). Here, the frequencies of the second frequency band utilized in carrier aggregation are higher than the frequencies of the first frequency band.

Next, the base station control device 3 determines whether the frequency range of harmonics of the uplink frequency range in the first frequency band overlaps the downlink frequency range in the second frequency band (S2). When there is no overlap, the state set in step S1 is maintained (from S2 to END).

When the frequency range of harmonics of the uplink frequency range in the first frequency band overlaps the downlink frequency range in the second frequency band, the base station control device 3 searches for an available channel at least one of in the downlink frequency channel in the first frequency band and the downlink frequency channel in the second frequency band (S3).

When the available channel is found, the base station control device 3 resets at least one of the downlink frequency channel in the first frequency band and the downlink frequency channel in the second frequency band by using the available channel such that the frequency range of harmonics of the uplink frequency range in the first frequency band does not overlap the downlink frequency range in the second frequency band (from S4 to S5 to S6 to END).

When no available channel is found, the state set in step S1 is maintained (from S4 to END). Even when the available channel is found, if that channel is determined to have an overlap between the frequency range of harmonics of the uplink frequency range in the first frequency band and the downlink frequency range in the second frequency band, the state set in step S1 is maintained (from S5 to END).

When a condition that the frequency range of harmonics of the uplink frequency range in the first frequency band does not overlap the downlink frequency range in the second frequency band is not found, the base station control device 3 may perform control such that carrier aggregation is not employed, from the viewpoint of preventing degradation in the reception sensitivity in the communication terminal.

Figure 6:
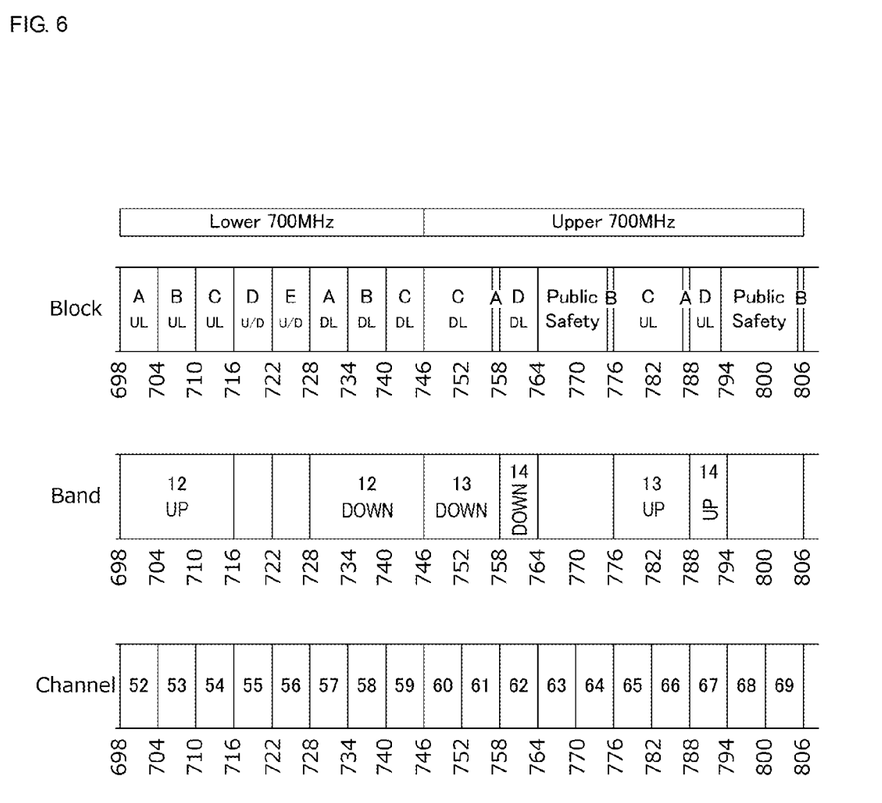
FIG. 6 illustrates one example of a relationship between frequency bands and communication channels.

FIG. 6 illustrates one example of a relationship between frequency bands and communication channels in the 700 MHz range. Here, block division is also illustrated. In FIG. 6, 698 to 806 are numeric values of frequencies. For example, the frequencies of 699 MHz to 704 MHz are assigned to a communication channel 52, the frequencies of 705 MHz to 710 MHz are assigned to a communication channel 53. For example, the communication channels 52, 53, and 54 are frequency channels in an uplink (up) in Band 12, and communication channels 57, 58, and 59 are frequency channels in a downlink (down) in Band 12.

The relationship illustrated in FIG. 6 is merely an example. The relationship between frequency bands and frequency channels are not limited to the above-described example.

Figure 7:
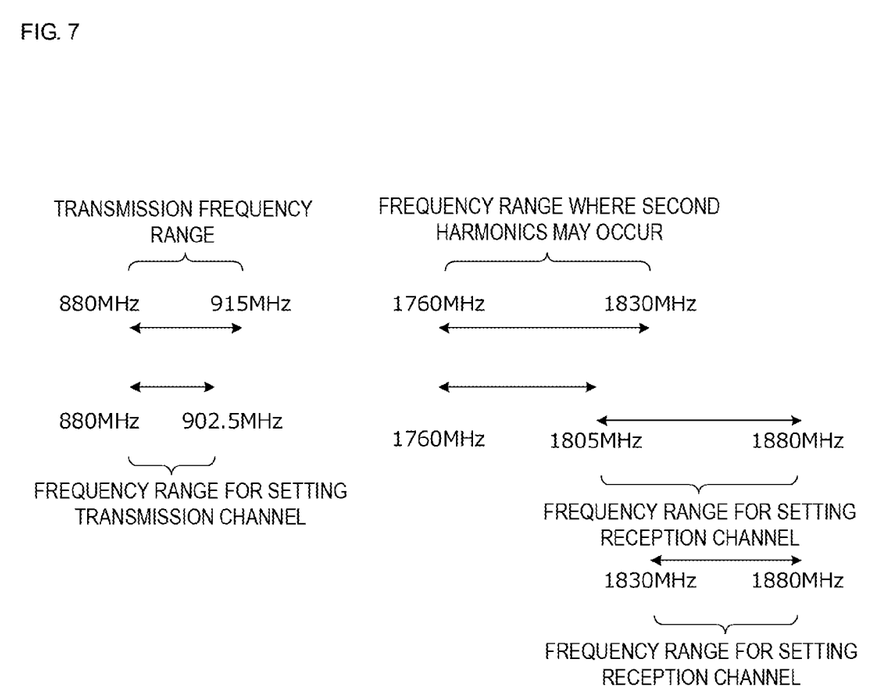
FIG. 7 illustrates frequency ranges for setting transmission channels and frequency ranges for setting reception channels when carrier aggregation is employed at two frequency bands of Band 3 and Band 8.

FIG. 7 illustrates frequency ranges for setting transmission channels and frequency ranges for setting reception channels when carrier aggregation is employed at two frequency bands of Band 3 and Band 8. As illustrated in FIG. 7, when the downlink frequency channel (transmission channel) in Band 8 is set at a channel within the 880 MHz to 902.5 MHz range, the frequency range of twice that frequency range is 1760 MHz to 1805 MHz, and thus the uplink frequency channel (reception channel) in Band 3 can be set at a channel within the 1805 MHZ to 1880 MHz range. When the downlink frequency channel (transmission channel) in Band 8 is set at a channel within the 880 MHz to 915 MHz range, the frequency range of twice that frequency range is 1760 MHz to 1830 MHz, and thus the uplink frequency channel (reception channel) in Band 3 can be set at a channel within the 1830 MHz to 1880 MHz range.

In the above-described embodiment, an example is illustrated in which the uplink frequency channel in the first frequency band is set such that the frequency range of two or three times the uplink frequency range in the first frequency band does not overlap the downlink frequency range in the second frequency band, the first frequency band and the second frequency band being included in the plurality of frequency band for use in carrier aggregation. The embodiment is also applicable in the case where the uplink frequency channel in the first frequency band is set such that the frequency range of n times (n is an integer more than one) the uplink frequency range in the first frequency band does not overlap the downlink frequency range in the second frequency band, the first frequency band and the second frequency band being included in the plurality of frequency band for use in carrier aggregation.

The embodiment is also applicable in other than the above-described combinations of the frequency bands. The embodiments can be applied in combinations in which the frequency range of n times the uplink frequency range in the first frequency band overlaps the downlink frequency range in the second frequency band, the first frequency band and the second frequency band being included in the plurality of frequency bands for use in carrier aggregation.

In the above-described embodiment, the circulators (15, 25) and variable filters (16, 17, 26, 27) constitute a tunable DPX. The present disclosure is not limited to that example. For example, in place of the above-described circuit configuration, a circuit configuration including a switch IC and a duplexer for each frequency band can also be used.

Finally, the description on the above-described embodiment is illustrative in all respects and is not restrictive. Modifications and changes may occur to those skilled in the art. The scope of the present disclosure is indicated by the claims rather than by the above-described embodiment. Furthermore, the scope of the present disclosure is intended to encompass changes from the embodiment within the meaning and scope equivalent to the claims.

REFERENCE SIGNS LIST

1 digital mobile subscriber switch
2 speech processing device
3 base station control device
4 base station modulation/demodulation device
5 base station amplifier device
6 base station antenna
11 antenna
12 antenna tuner
13 diplexer
14 low pass filter
15, 25 circulator
16, 17, 26, 27 band pass filter
18, 28 reception signal amplifier circuit
19, 29 transmission signal amplifier circuit
31 channel setting unit
32 determining unit
33 available channel searching unit
34 channel resetting unit
101 base station apparatus
201 communication terminal

The invention claimed is:

1. A frequency channel setting method being a method for setting a communication channel for a base station that employs carrier aggregation, which enables simultaneous use of radio waves at a plurality of frequency bands of different frequencies, the frequency channel setting method comprising:

setting, by the controller of the base station, uplink and downlink frequency channels in a first frequency band and uplink and downlink frequency channels in a second frequency band, the first frequency band and the second frequency band being included in the plurality of frequency bands for use in carrier aggregation, and the second frequency band having frequencies higher than frequencies of the first frequency band;

determining, by the controller of the base station, whether a frequency range of harmonics of an uplink frequency range in the first frequency band overlaps a downlink frequency range in the second frequency band;

searching, by the controller of the base station, for an available channel in at least one of the downlink frequency channel in the first frequency band and the downlink frequency channel in the second frequency band when the frequency range of harmonics of the uplink frequency range in the first frequency band overlaps the downlink frequency range in the second frequency band; and resetting, by the controller of the base station, at least one of the downlink frequency channel in the first frequency band and the downlink frequency channel in the second frequency band to the available channel such that the frequency range of harmonics of the uplink frequency range in the first frequency band does not overlap the downlink frequency range in the second frequency band, when the available channel is found.

2. A base station apparatus for setting a communication channel in accordance with carrier aggregation, which enables simultaneous transmission and reception at a plurality of frequency bands of different frequencies, the base station apparatus comprising a controller configured to:

set at least one of a downlink frequency channel in a first frequency band and a downlink frequency channel in a second frequency band such that a frequency range of harmonics of an uplink frequency range in the first frequency band does not overlap a downlink frequency range in the second frequency band, wherein the first frequency band and the second frequency band is included in the plurality of frequency bands used in carrier aggregation, and wherein the second frequency band has frequencies higher than frequencies of the first frequency band, the controller being further configured to:

determine whether a frequency range of harmonics of an uplink frequency range in the first frequency band overlaps a downlink frequency range in the second frequency band;

search for an available channel in at least one of the downlink frequency channel in the first frequency band and the downlink frequency channel in the second frequency band when the frequency range of harmonics of the uplink frequency range in the first frequency band overlaps the downlink frequency range in the second frequency band; and reset at least one of the downlink frequency channel in the first frequency band and the downlink frequency channel in the second frequency band to the available channel such that the frequency range of harmonics of the uplink frequency range in the first frequency band does not overlap the downlink frequency range in the second frequency band, when the available channel is found.

* * * * *